United States Patent
Walter et al.

(10) Patent No.: US 7,689,654 B2
(45) Date of Patent: Mar. 30, 2010

(54) EMAIL ADDRESS VERIFICATION (75) Inventors: Jason Walter, San Jose, CA (US); Aditya Bansod, San Francisco, CA (US); Eliot C. Gillum, Los Gatos, CA (US)

(73) Assignee: SanDisk Corporation, Milpitas, CA (US)

( * ) Notice: Subject to any disclaimer, the term of this patent is extended or adjusted under 35 U.S.C. 154(b) by 997 days.

(21) Appl. No.: 11/085,373

(22) Filed: Mar. 21, 2005

(65) Prior Publication Data

US 2006/0212522 A1 Sep. 21, 2006

(51) Int. Cl.
G06F 15/16 (2006.01)
H04L 9/32 (2006.01)

(52) U.S. Cl. .................. 709/206; 709/245; 713/176

(58) Field of Classification Search ............... 709/226, 709/206, 245; 713/176
See application file for complete search history.

(56) References Cited

U.S. PATENT DOCUMENTS 7,313,700 B2 * 12/2007 Delany ................ 713/176
2002/0103932 A1 * 8/2002 Bilbrey et al. ............ 709/245
2003/0200265 A1 * 10/2003 Henry .................... 709/206
2005/0010644 A1 * 1/2005 Brown et al. ............ 709/206
2005/0251861 A1 * 11/2005 Cunningham et al. ...... 726/23
2005/0278430 A1 * 12/2005 Cato ..................... 709/206
2006/0135135 A1 * 6/2006 Rybak ................. 455/414.1
2006/0168019 A1 * 7/2006 Levy ..................... 709/206

\* cited by examiner

*Primary Examiner*—George C Neurauter, Jr.
*Assistant Examiner*—Anish Sikri
(74) *Attorney, Agent, or Firm*—Vierra Magen Marcus & DeNiro LLP (57) ABSTRACT

A system and method for sending email. The method includes the steps of receiving: an email address including a destination domain from a user; prior to sending a message to the destination domain, determining whether the destination domain will receive email; and providing an indication to the user that the email may not be deliverable to the address. In one embodiment, the step of determining includes maintaining a list of problematic destination domains and checking the destination domain against said list.

18 Claims, 6 Drawing Sheets

EMAIL ADDRESS VERIFICATION

BACKGROUND OF THE INVENTION

1. Field of the Invention

The invention concerns email processing, and in particular, ensuring email messages are sent to the correct address domain.

2. Description of the Related Art

As the growth of email continues, the potential for messages to be addressed incorrectly likewise increases. Email address take the well known format "user@domain", where "user" is a unique user identifier at a given "domain name" address. A domain name is the unique name of a computer on the Internet that distinguishes it from the other systems on the network. Every website, email account, etc, on the Internet is hosted on at least one computer (server) a having unique IP address. Because it is difficult to remember numbers, an IP address can be associated with a fully qualified host name (a domain name), such as "www.foo.com". Domain names also provide a persistent address for some service when it is necessary to move to a different server, which would have a different IP address.

On the Internet, the destination domain's configuration determines where to deliver a message. Generally the message is delivered first determining what host the message should be sent to and then delivering it directly to that host. The sending server will first look for a Mail Exchanger (MX) record for its domain in a DNS database. MX records are always assigned a preference. If several mail exchangers exist for one host, the mail transport agent will try to transfer the message to the exchanger with the lowest preference value, and only if this fails will it try a host with a higher value. If there is no MX record for a domain, or no MX records left that are suitable, the mail transport agent is permitted to see if the domain has an IP address associated with it (an address or "a-" record) and attempt delivery directly to that host.

Currently, if a sending email server can find either an MX record or an address record, but cannot deliver the mail, the sending server's queue is impacted as well as the user who send the original mail. This problem has become more acute due to the large number of domain names registered every year which have address records, but which are not used for any real purpose. In addition, mistyped email domains are particularly problematic for email service providers, such as Hotmail and Yahoo mail, where users' can routinely misspell domain names.

Errors in an email address can result from an error in the user address name or in the domain name. When a sender initiates transmission of an email message, the sender's messaging server attempts to make delivery using standard protocols. If an error in the addressee's name is present, but the domain is correct, the sender's messing server should be able to make contact with the addressee's domain mail server. The addressee's server will indicate that no such user is present at the domain and an error will be returned to the sender, generally within a short period of time.

However, if the error is in the domain name portion of the intended recipient's address, the error may not be known to the user for some time. Generally, if a mail system cannot communicate with a domain to deliver mail to it, the mail server will queue the outbound mail for some period of time (on the order of days) before indicating a mail delivery failure. If a mail is still undeliverable after a configured elapsed time interval, then a Non Delivery Report is sent. Once a mail is accepted by the user's own mail server, many users will assume it has been delivered, even thought it actually remains in the mail server's queue. It is not until the mail delivery is attempted that the user might get an NDR, and in some cases, if the domain name was mistyped or if the domain is not configured to accept mail, then it may be multiple days (waiting for time out parameters) before an NDR is sent.

SUMMARY OF THE INVENTION

The invention, roughly described, includes a method for sending email. The method includes the steps of receiving: an email address including a destination domain from a user; prior to sending a message to the destination domain, determining whether the destination domain will receive email; and providing an indication to the user that the email may not be deliverable to the address.

In one embodiment, the step of determining includes maintaining a list of problematic destination domains and checking the destination domain against said list.

In another embodiment, the invention comprises a method of providing an email service. In this embodiment, the method includes the steps of: providing an email composition interface; receiving a destination email address including a destination domain from the composition interface; determining whether the destination domain will receive email; and providing an indication to the user that the destination domain may not receive email.

In another embodiment the invention comprises a method of displaying information to the user in a computer system having a graphical user interface including a display and a user interface selection device. The method includes the steps of: retrieving a user input email address including a domain; receiving a signal indicative of ability of the domain to receive email; and displaying an indicator if the domain cannot receive email The present invention will appear more clearly from the following description in which the preferred embodiment of the invention has been set forth in conjunction with the drawings.

DETAILED DESCRIPTION

A system and method for determining the validity of an email address, and in particular the domain portion of an email address, provides users with feedback prior to sending a message to an incorrect address. In one embodiment, the invention is a dynamic process for checking the validity of the domain portion of an email address to determine the ability of the domain as entered to accept email. In one embodiment, a list of problematic destination domains that do not receive email is created and checked against an entered destination domain. When the user composes an email address, and then moves on to composing the text of the message, the process checks the domain against the list of problematic destinations or uses a set of heuristics to determine if the domain is likely to be problematic. If the domain is an undeliverable domain, the user is notified by, for example, displaying a colored line under the domain portion of the email address. The invention can be performed on a web-based email service, by an email service provider, in an enterprise email server or system, and/or by an individual message transfer agent (MTA) operated by a user.

Figure 1:
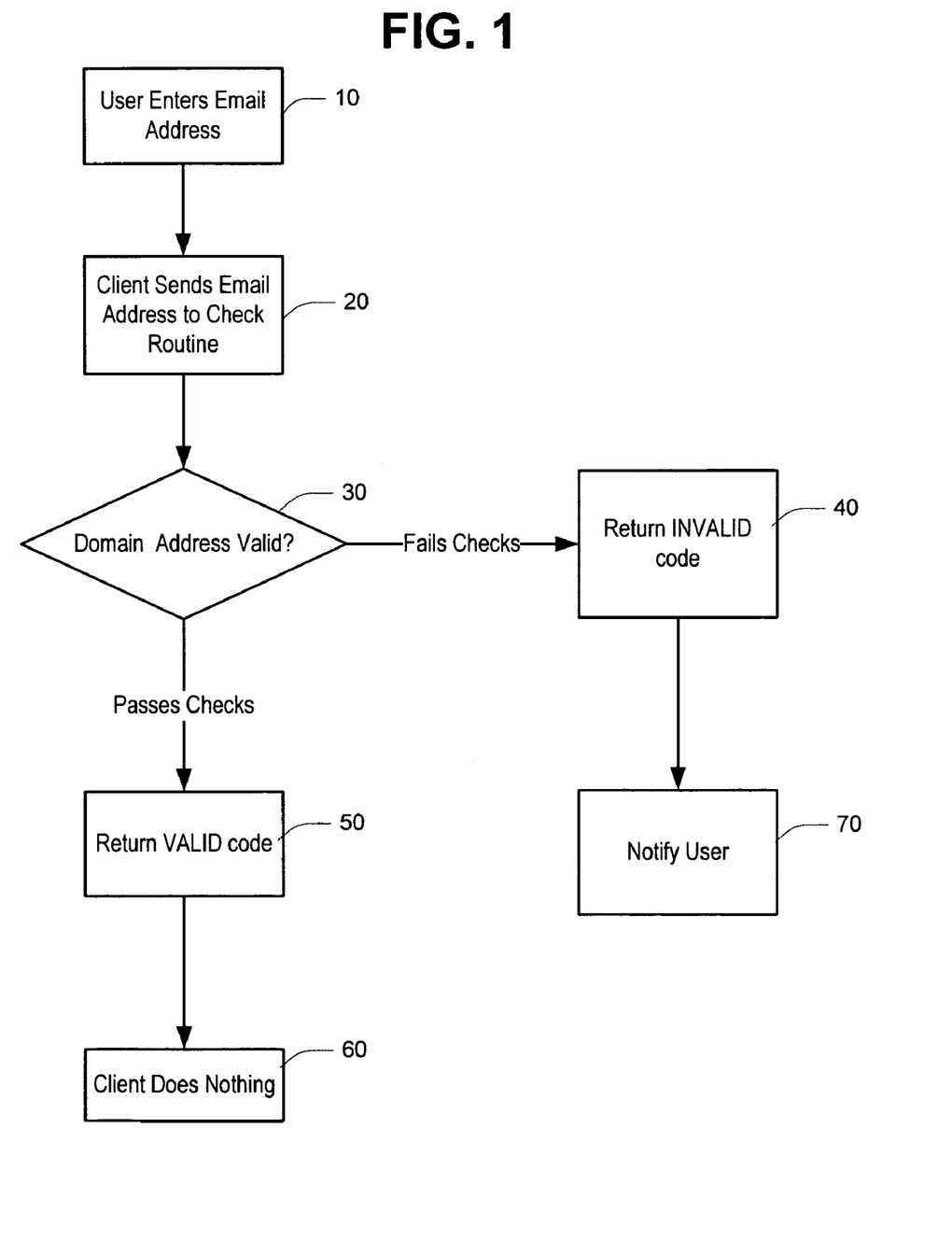
FIG. 1 is a flowchart illustrating a method of the present invention.

FIG. 1 illustrates a first embodiment of a method in accordance with the present invention. At step 10, a user-entered email address will be input by a user, and at step 20, the email address will be received by the method. Numerous mechanisms for implementing step 20 are discussed below, depending on whether the method is implemented in a web-browser based system or a traditional client/server system.

Next, at step 30, a check is made to determine whether the email domain one which is capable of receiving mail. The manner and time when the email address is provided at step 20 and the check is run at step 30 may vary, but in one embodiment, the method is run concurrently with the user entering other information into an email composition screen.

Figure 2:
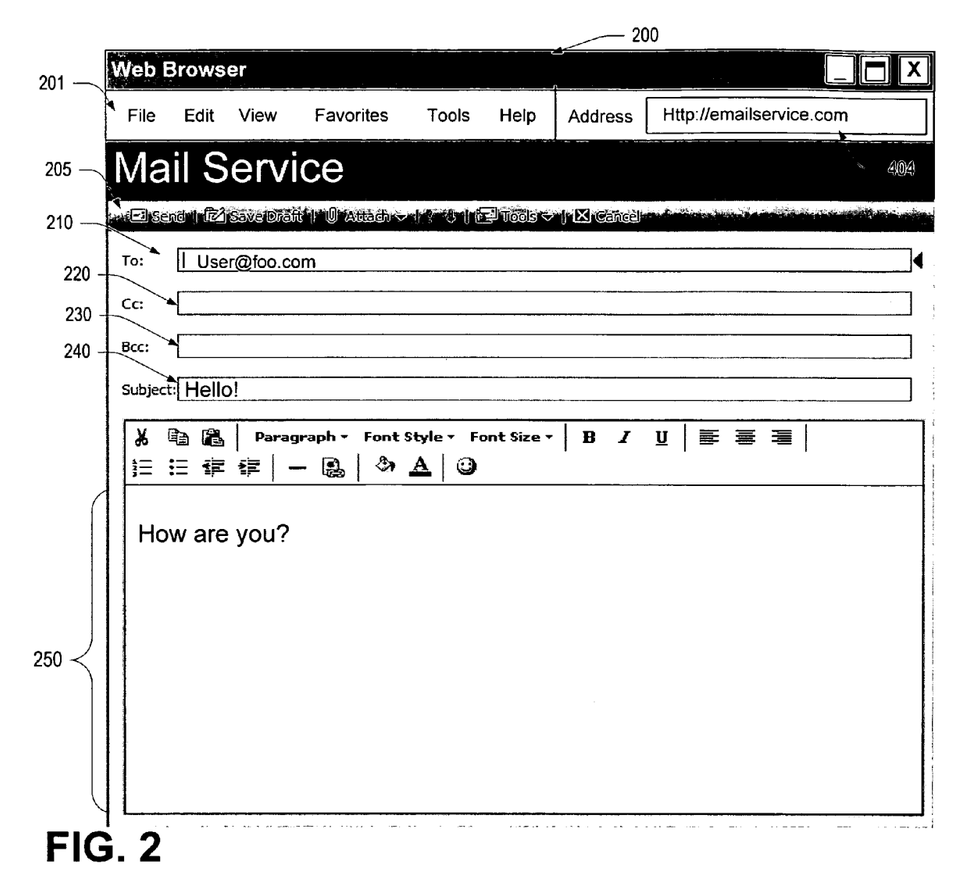
FIG. 2 is an exemplary email composition screen which may be used by a sending user in accordance with the present invention.

FIG. 2 shows an exemplary email composition screen such as that which may be provided by an email service provider via a web interface. The interface may be provided in a web browser page 200. A typical browser application may provide elements such as a menu-bar 201 to implement browser specific instructions, and an address bar 204 allowing the user to enter the uniform resource locator (URL) of the web address the user wishes to view, such as that of the email service provider.

A typical composition interface 200 will include a function menu 205 allowing the user to "send" or "save as draft" a copy of the message, attach a file to the message, set a priority to the message or access other tools to compose the message, such as a spell checker. Components of the composition interface 200 are accessible to a computer user via the computers interface, typically a graphical user interface which includes a display element selection device such as a pointer or cursor, activated by a mouse or keyboard. Interface 200 also includes a "TO:" field 210, a CC field 220, a BCC field 230, a subject field 240 and a message field 250. Many users compose a message by first entering the address in the "TO:" filed 210. Next, they will move the active cursor to another field to continue imputing the message. When the cursor is moved to the next field (after completion of the "TO" line), in one embodiment, the email address is gathered (step 20) and operated on at step 30 if FIG. 1. In another embodiment, the email address is gathered when the user selects to "send" the message, or uses a "spell check" function. The invention thus contemplates checking the email address while the user is composing other portions of the message, or waiting until email submission to perform step 30. Alternatively, a metric such as edit distance can define a threshold under which a communication is made to the user (via red squiggly, prompt, etc) that the user may have misspelled an address and provide suggestions for correction, as discussed below.

Although the interface depicted in FIG. 2 is a web-based interface, it will be readily understood that the invention is not limited to a web-based email system. Most email client interfaces include the standard elements of a to, cc, bcc, subject and message field, and the invention could be readily utilized with any such email client. Such email clients can include Microsoft's Outlook®, and Outlook Express®, among others.

Once the system has determined that a domain may be a problem, it may, in addition to providing an indication that the domain entered is problematic, provide suggestions on correct domains via window 260. Window 260 may be displayed by a mouse-over event on the TO field, or as a pop-up when the user selects to send a message or moves to a different field. These suggestions may be culled from the user's address book, sent items, or a data store of similar domains to which email has been successfully routed.

Returning to FIG. 1, once the email address is garnered from the user, step 30 determines whether the input address is valid or whether there will be a problem delivering mail to the domain based on a number of checks. If the address is valid, a "valid" code may be returned to the client at step 50 and the client need not provide any indication to the user that the check was made at step 60. However, if the server address is found to be problematic, an invalid code is returned at step 40 and the client notifies the user at step 70. As noted below, the manner in which the user is notified can take many forms.

Figure 3:
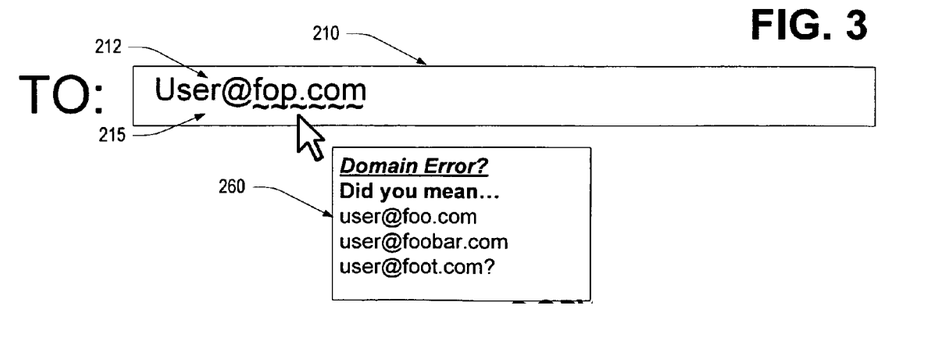
FIG. 3 is an enlarged portion of the composition screen of FIG. 2 illustrating one mechanism for providing feedback to the user in accordance with the present invention.

FIG. 3 illustrates an enlarged portion of the interface screen of FIG. 2 showing one manner of illustrating a problem with the domain to the user. Where the method has determined at step 30 that problems have or will occur in delivering email to the domain, the interface can display an underscored "tilde" mark in various colors under the entire email or under the domain only. This display is similar to the manner in which many well known web-based email servers display indications of incorrect spellings in a compose screen when a user runs a spell check program on the proposed message text. In one aspect, this can be implemented by instructing a web-browser to render the text in the field with a style sheet definition. Alternative displays include changing the color, font or style of the text displayed in the TO window, or highlighting the text. Further alternatives include providing audible signals to the user.

In a further aspect, alternative indicators may be used to show different levels of concern about the address. For example, the colors of the indicator on the TO line may vary based on the accuracy of the determination about the destination domain. In one embodiment of the method, a domain delivery history may be maintained. Domains having successful mail deliveries in the past, but which for a short recent period fail the checks initiated at step 30, may be treated differently than domains to which mail has never been successfully delivered. In the former case, a yellow tilde line may be used to indicate to the user a potential problem with a previously known-good domain, while the latter may be signaled with a red tilde line. Yet another color may indicate an improper email or domain syntax in the address.

Figure 4:
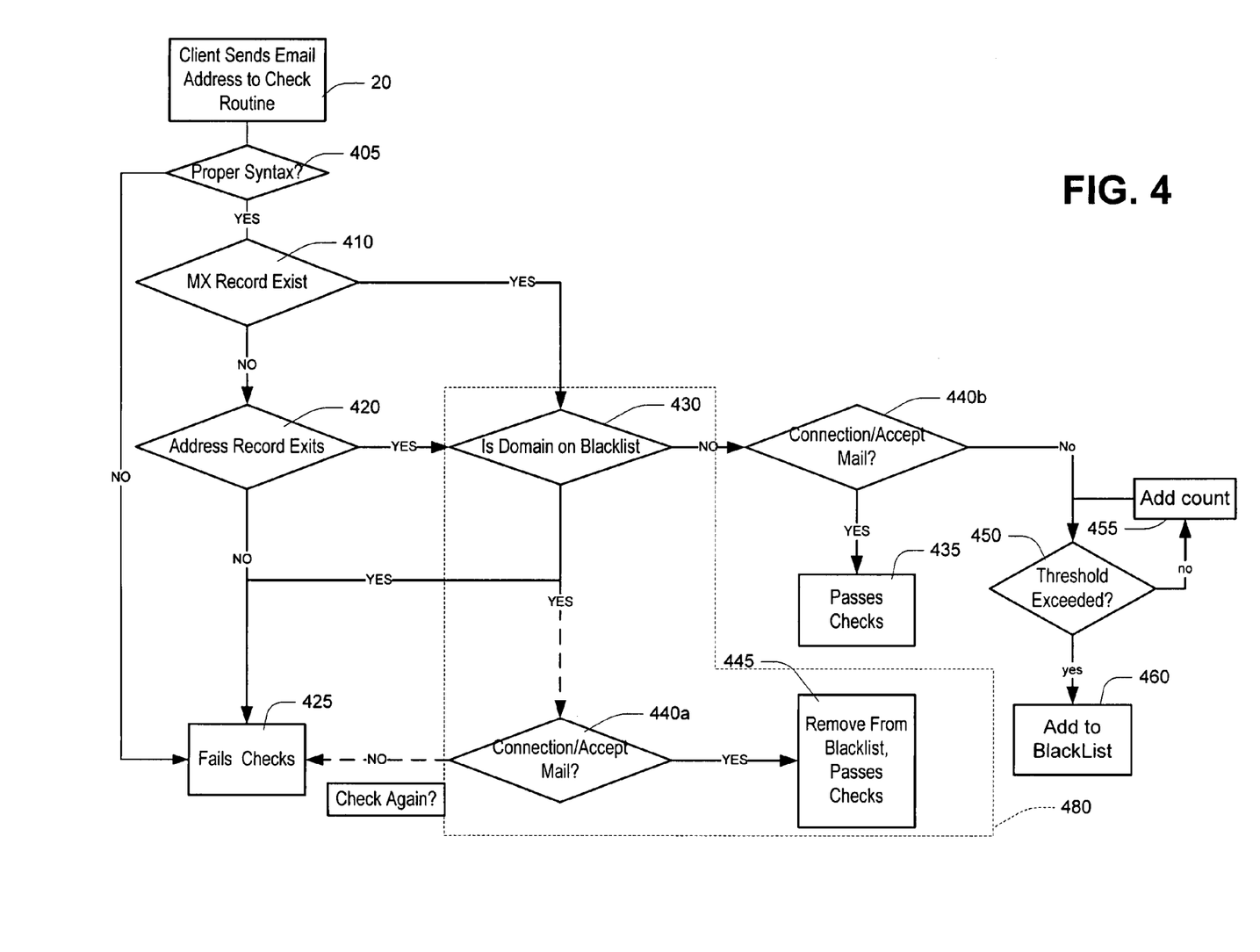
FIG. 4 is a flowchart illustrating a method for determining whether to notify a user of a problem with a domain address.

FIG. 4 illustrates the method for checking a blacklist of problematic domains and updating the list. At step 20, the email is received from the user. At step 405, an initial determination is made as to whether the user has input a correct email syntax. For example, if the user has left off the "@" symbol, or input an incorrect top level domain indicator (such as "co" instead of ".com"), the method immediately fails the domain. At step 410, the domain portion of an email address input by the user at step 10 is first checked to determine whether an MX record exists for the domain.

If the MX record exists, the domain may still not be accepting email, and hence if the record exists, the domain is checked against a "blacklist" of known problem email domains at step 430. As described below, the blacklist is built by checking email domains to determine whether such domains accept email. If the MX record for the domain does not exist, then the method will check to determine whether an address record exists at step 420. Because there are more domains with address records than MX records, it is much more likely that an address record will exist for a domain, and an email system will still attempt to route email to domains for which an address record is found. Hence, if the address record exists at step 420, the blacklist is checked at step 430. If the domain is on the blacklist at step 430, the domain has failed the checks (step 425) and the user is notified that a problem with the domain may exist at step 70 in FIG. 1. Providing a notification of a problem with the domain before the user sends the message allows the user to make corrections to the address before sending the email. At the very least, the user knows in advance that there may be a problem with the email.

If the domain is not on the blacklist, the method determines whether it should be added to the list by checking whether the domain is accepting email at step 440. If the domain does accept email, then the inquiry ends at step 435. However, if the domain does not accept email, then steps 450 and 455 determine whether the domain should be added to the blacklist. Note that in one embodiment, the domain can be added to the blacklist immediately after the method determines at step 440 that the domain is not accepting email. Alternatively, steps 450 and 455 provide a minimum threshold number of attempts to deliver email to the domain before the domain is added to the blacklist. At step 450, a threshold count of failed delivery attempts is determined before adding the domain to the blacklist at step 460. If the threshold, for example 10 failed attempts, is exceeded, the domain is added at step 460. If the threshold is not exceeded, a count is added at step 455 and the method awaits the next instance of a failed delivery. It should be noted that the addition of a domain to a blacklist at step 460 can likewise trigger a notification to a user at step 425. That is, once the threshold is exceeded, the user can be notified rather than waiting for the next instance of an email attempt addressed to that domain.

Returning to step 430, the method also ensures that legitimate domains which may be added to the blacklist can be timely removed. At step 430, if a domain is determined to be on the blacklist, connection attempts can be repeated at step 442 to determine whether the domain is now accepting email. Once a listed domain does accept email, then the domain will be removed at step 445. The dashed line between steps 430 and 442 indicates that step 442 can be temporally separated from step 430. Alternatively, step 442 can be performed for each instance of a user input of the domain at step 20, and the result provided to step 425.

In another alternative, steps 430 442 and 445 may comprise a maintenance method 480 performed to clean the blacklist at intervals selected by a user administrator without reference to the appearance of a domain in an email address at step 30.

In still another alternative, the blacklist comparison at step 430 may be expanded to include other lists. For example, step 430 can include a comparison of recipient domain against a list of people in a user's address book, a safe list, sent mail records or other user-centric data.

At steps 440 and 442, the test of whether a domain will accept email comprises a determination of whether a connection can be made to the domain. For example, a typical connection using TCP contains a 3-way handshake. If a destination domain is open for communication, typically it will have an open socket listening passively for a connection from others. The sending entity initiates an active open by sending an initial SYN segment to the receiver as part of the three-way handshake. The destination should respond to a valid SYN request with a SYN/ACK. Finally, the sender should respond to the server with an ACK, completing the connection. In the foregoing embodiment, if a connection can be made to the destination server, steps 440 and 442 will be determine the domain to be accepting emails.

A still further alternative provides a more extensive test of the connection to the domain in question. In this embodiment, more extensive use of the Simple Mail Transfer Protocol (SMTP) protocol is used up to the point where a receiving host would be ready to receive data. This is best understood by reference to an exemplary exchange between a sending computer (S) and receiving computer (R), which might occur as follows:

R: 220 www.example.com ESMTP Postfix
S: HELO mydomain.com
R: 250 Hello mydomain.com
S: MAIL FROM: sender@mydomain.com
R: 250 Ok
S: RCPT TO: friend@example.com
R: 250 Ok
S: DATA
R: 354 End data with <CR><LF>.<CR><LF>
S: Subject: test message
S: From: sender@mydomain.com
S: To: friend@example.com
S:
S: Hello,
S: This is a test.
S: Goodbye.
S: .
R: 250 Ok: queued as 12345
S: quit
R: 221 Bye In the foregoing example, email is fully processed and data ("Hello, This is a test. Goodbye.") is sent. In an alternative embodiment, steps 440 and 442 are preformed by issuing commands up to the issuance of the DATA command, to determine whether the destination domain (R in the foregoing example) is willing to receive data from the sender. This alternative provides a good representation of whether the destination domain will receive email data.

Figure 5:
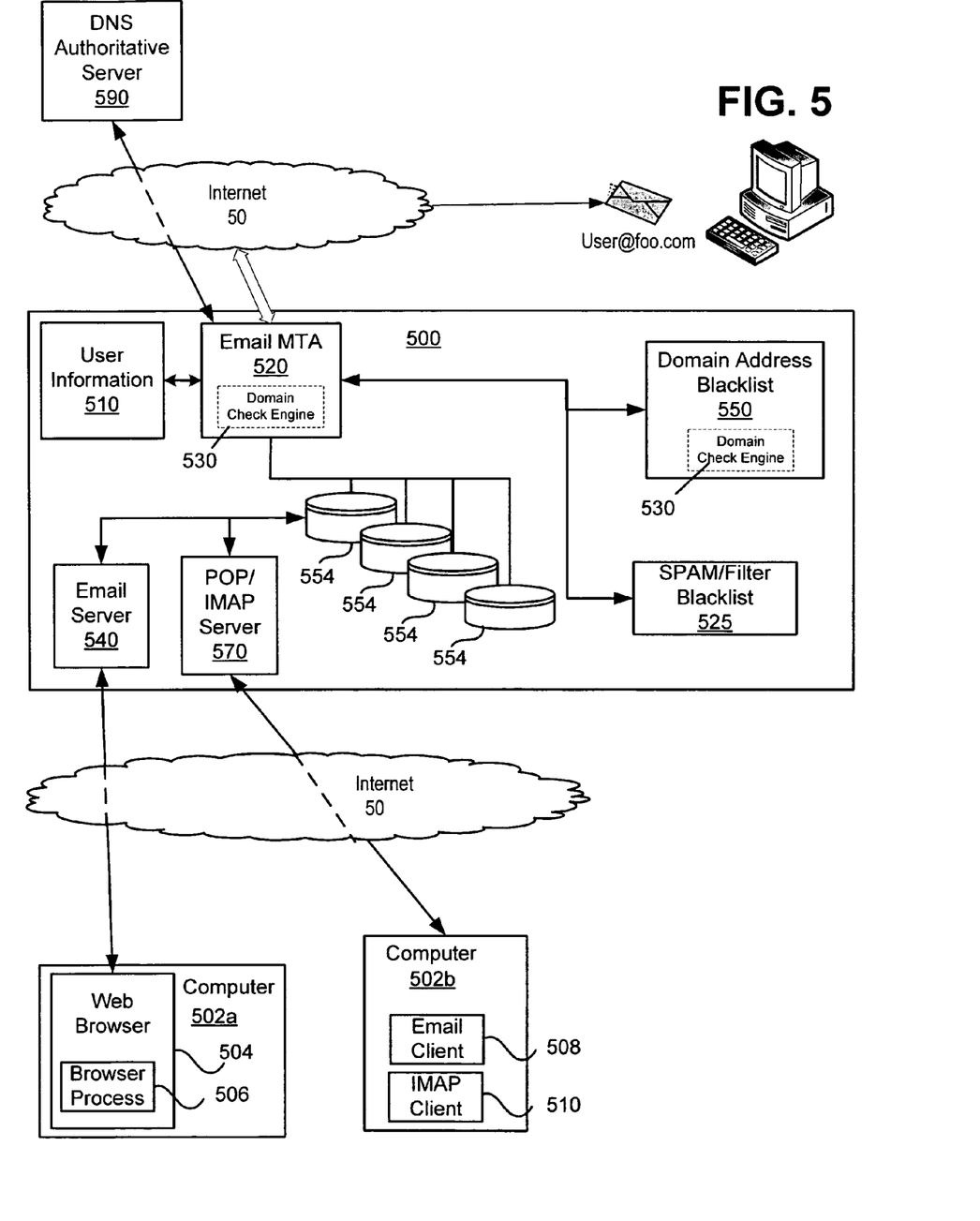
FIG. 5 is a block diagram illustrating a system for implementing the present invention.

FIG. 5 illustrates a system for implementing the method described in FIGS. 1-4. FIG. 5 is a block level diagram of a system suitable for implementing the present invention. System 500 is comprised of a plurality of computing devices maintained by an enterprise service provider or ESP. In one embodiment, it may consist of, for example, an message transfer agent (MTA) 520, a user information database server 510, user mail storage units 554, an email server 550, SPAM/Blacklist server 525 and a POP/IMAP server 570. System 500 also includes a domain address blacklist database server 550.

System 500 allows users operating processing devices 502*a*, 502*b* to access their email data and forward outbound messages to users within the domain of system 500 and domains accessible via the Internet 50. Typical messages from senders to users having accounts with the ESP are sent via Internet 50 to the MTA 520. Outbound messages from users on computers 502*a* and 502*b* are sent to other users on the Internet and in ESP 500 via the MTA 520. It should be understood that users themselves may connect to system 500 via any number of public or private networks, including the Internet. Email MTA 520 generally uses SMTP to route mail via the Internet 50 to users at other Internet accessible domains.

Email MTA 520 is a front end server to which emails 590 transmitted via the Internet (or other suitable network) to the system 500 are directed, and which forwards messages from users of the messaging system 500. It should be understood that in a web based ESP, a number of email MTAs 520 will be present. The user database server 510 is a data store of user account and storage location information for each of the users having a user account or email address within system 500. The user database server 510 stores information allowing users to authenticate themselves to the system 500 to access their email, and to allow other servers in the system to direct mail within the system to storage locations on storage units 554 based on the routing instructions in the system 500. The storage units 554 are essentially large disc arrays storing actual user message information. The system may include additional components not shown here for convenience in understanding the present invention. Spam/Blacklist server 525 runs SPAM filters on incoming messages to segregate them from user accounts.

Email server 540 may comprise a Web server which provides an email interface to a Web browser 508 which institutes a browser process 506 on a user computer 502a. Email server 540 can render email data from the data storage units to a user using computer 502 to access the email system 500. Likewise POP/IMAP server 570 can provide email data to a POP email client 518 or an IMAP client 510 on user computer 502b. Server 540 may also render the notifications to the user discussed above with respect to FIG. 2.

In one embodiment, the methods disclosed with respect to FIGS. 1 and 4 may be run on a domain check engine 530 operating on the Email MTA 520. The domain check engine is a series of instructions causing a processing device (the MTA) to perform the methods detailed in FIGS. 1-4. For example, the engine 525 can query a DNS authoritative server 590 via the standard SMTP operations of the MTA. That is, the domain check engine can allow the MTA to perform its standard routing functions once it receives an address domain to check, and receive the results from the SMTP engine in the MTA. It should be understood that the authoritative server 590 may be an internal server of system 500, or the MTA may use cached DNS entries which are periodically refreshed in order to speed performance of system 500. Information garnered by the domain check engine can be stored in the domain address database server 550 for use by other MTAs in system 500. Alternatively, the domain check engine may be run on server 550 and access one or more MTAs 520.

The domain address database server 550 may include a data store and instructions to periodically retrieve information from other servers (MTAs or domain servers) in the system. Database server 550 may be implemented by a SQL data store, a simple table structure, or other database implementations, as is a system where no database server 550 is provided, but data is retrieved from records stored directly on the MTAs. As noted above, the domain address server 550 may maintain historical data on "known-good" domains to which email has been successfully delivered in the past. In such cases, the indicator for "passes checks" in FIG. 1 may be modified to include additional information indicating the type of message to display to the user about the domain.

Where the invention is implemented in a web-based system and the method includes accepting the address while the user composes another part of the message, the invention may optimally be provided using an asynchronous communication method between the server and the client, including Common Object Request Broker Architecture (CORBA) and that identified in co-pending U.S. patent application Ser. No. 11/028,915 entitled "Web Application Architecture", inventors Aditya P. Bansod, Walter C. Hsuch and Chun Yu Wong, assigned to the assignee of the present application.

Figure 6:
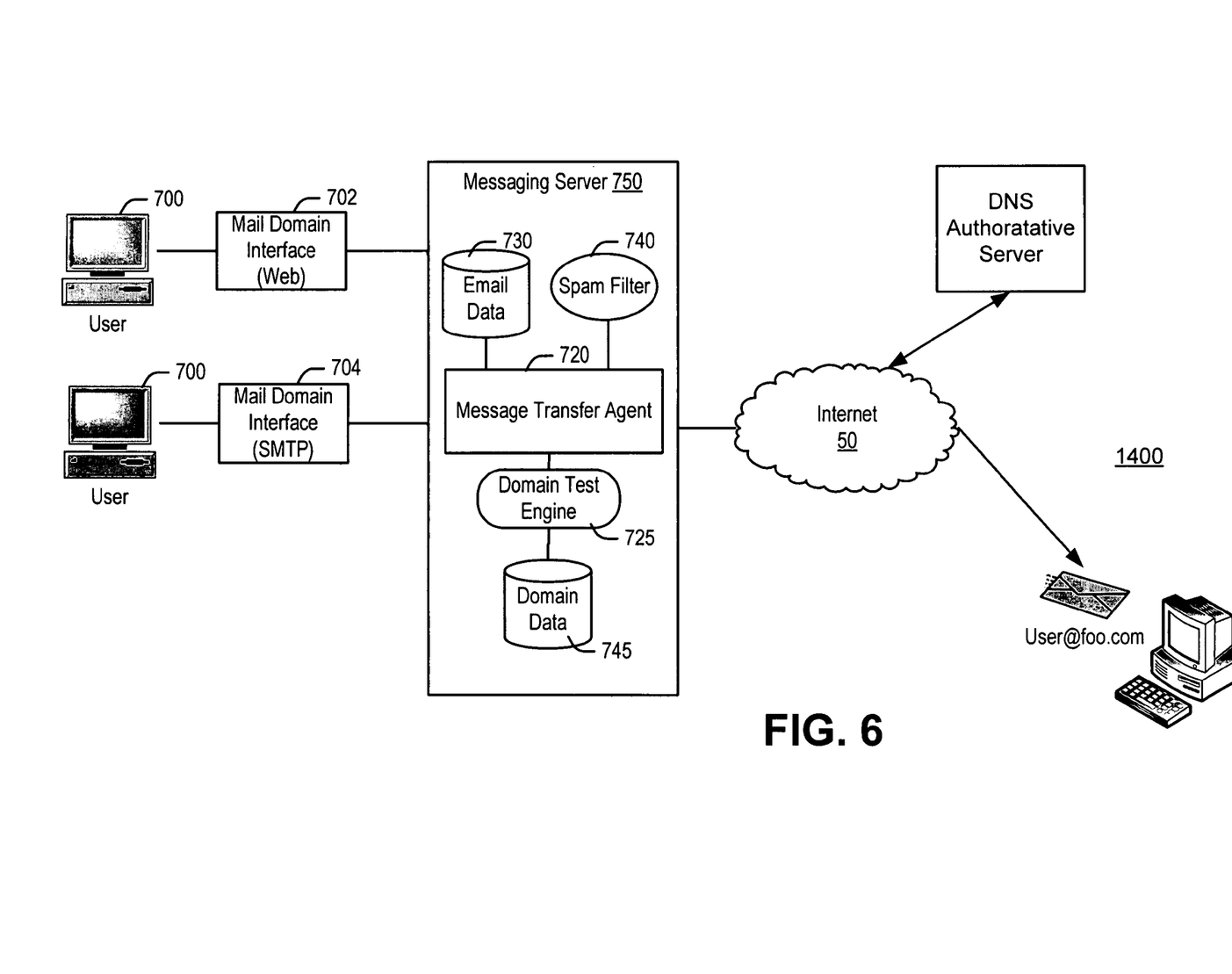
FIG. 6 is a block diagram illustrating a second system for implementing the present invention.

FIG. 6 illustrates a second system for implementing the present invention. The messaging system may allow one or more user devices 700 to couple to a messaging server 750 via one or more server interfaces 702, 704. Devices 700, 710 and 750 may all be comprised of one or more processing devices 100 as described in FIG. 7. The server 750 may include a message transfer agent 720 which transfers messaging data to a message data store 730. A spam filter application 740 may be incorporated with the message transfer agent 720 or may operate in conjunction with the transfer agent to filter spam before or after a message is handled by the message transfer agent. In one embodiment, mail server 750 includes domain check engine 725, including instructions for causing the processing device to implement the methods described above with respect of FIGS. 1-4. The module 725 may be incorporated into or cooperate with the message transfer agent 720. In this embodiment, the MTA 720 operates in a single email server 750 for the domain.

Figure 7:
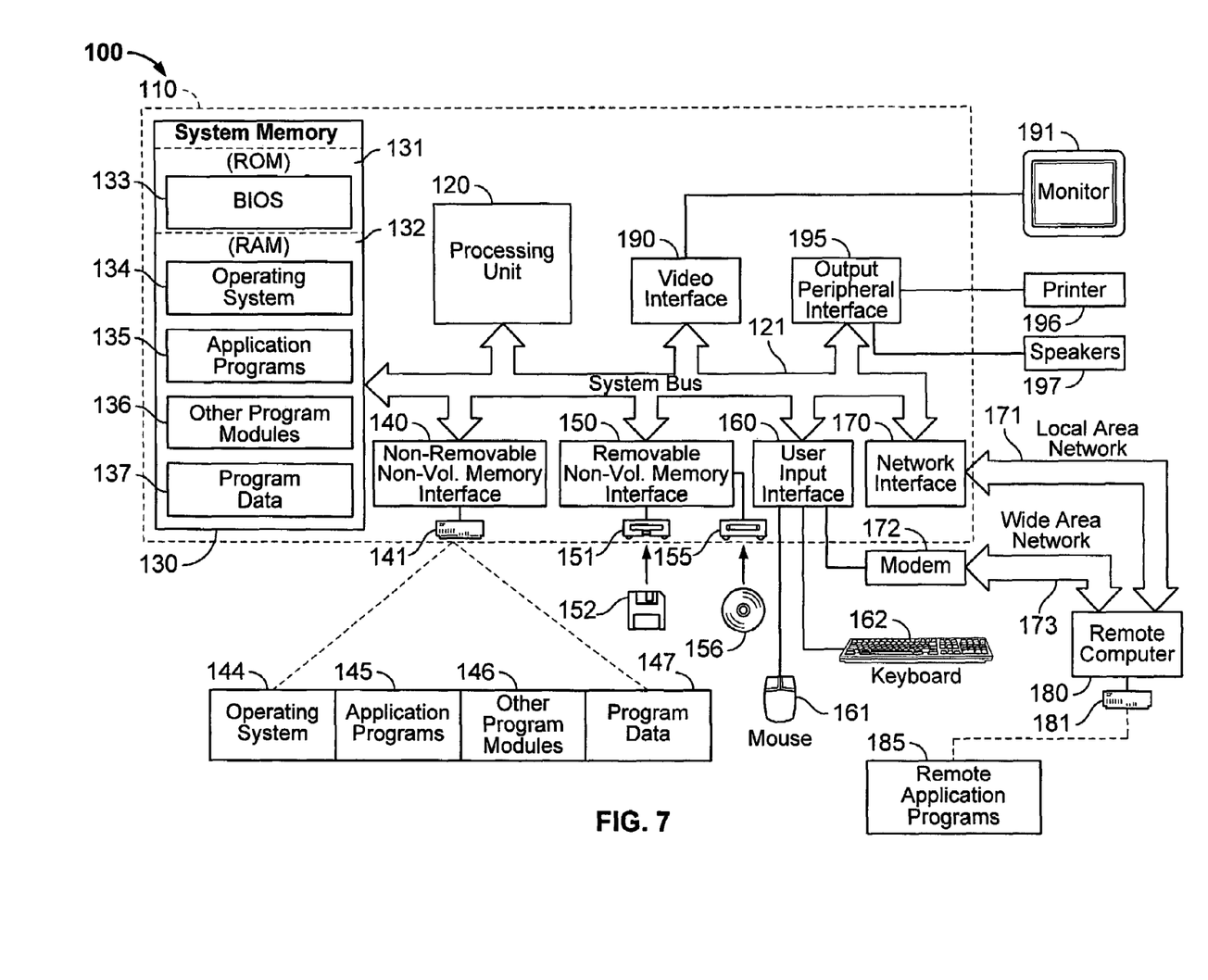
FIG. 7 is a block diagram of a processing device suitable for implementing any of the processing devices illustrated in FIG. 5 or 6.

FIG. 7 illustrates a processing device suitable for implanting any of the processing devices illustrated in FIG. 5 or 6.

FIG. 7 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 7 illustrates operating system 134, application programs 135, other program modules 136, and program data 137.

The computer 110 may also include other removable/non-removable, volatile/nonvolatile computer storage media. By way of example only, FIG. 7 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 7. The logical connections depicted in FIG. 7 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 7 illustrates remote application programs 185 as residing on memory device 181. It will be appreciated that the network connections shown are exemplary and other means of establishing a communications link between the computers may be used.

The foregoing description has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for sending email, comprising:
   (a) receiving an email address composed by a user, wherein the email address includes a destination domain;
   (b) while the user is composing another portion of an email message associated with the email address received in step (a), determining whether the destination domain as composed by the user in the email address is located on a list of destination domains that do not accept email, wherein the list of destination domains is stored in computer storage media;

(c) if the destination domain is located on the list of destination domains not accepting email, graphically modifying the destination domain of the email address in the email message composition screen to indicate to the user that the email may not be deliverable to the email address; and (d) if the destination domain is not located on the list of destination domains not accepting email, determining whether the destination domain as composed by the user is accepting email by attempting to connect to a destination server associated with the destination domain, and adding the destination domain to the list of destination domains not accepting email if a connection cannot be made to the destination server associated with the destination domain.

2. The method of claim 1 wherein the step (b) of determining includes maintaining a list of problematic destination domains and checking the destination domain against said list.

3. The method of claim 1 wherein the step (b) of determining includes maintaining the list of destination domains.

4. The method of claim 1 wherein the step (d) of determining includes checking whether a destination domain has a valid DNS mail routing record.

5. The method of claim 1 wherein the step (d) of determining includes checking a destination domain for a connections.

6. The method of claim 1 wherein the step (d) of determining includes checking the address for valid syntax.

7. The method of claim 1 wherein the method includes performing said step (b) of determining step in the background while the user is composing another portion of an email message.

8. The method of claim 7 further comprising the step of:

(e) adding the destination domain composed by the user to the list of destination domains that do not accept email if the attempt to connect to the destination server fails.

9. The method of claim 1 wherein the step (b) of determining includes maintaining known-good domain information and comparing the results of said determining step to said known-good information.

10. The method of claim 1 wherein the step (c) of providing includes the steps of providing a first indicator if the destination domain composed by the user is a previously known-good domain, and providing a second indicator if the destination domain composed by the user is not a previously known-good domain.

11. The method of claim 1 wherein the step (d) of determining includes checking a destination domain for acceptance of SMTP data.

12. The method of claim 1 wherein the step (d) of determining includes checking the domain against user-centric information.

13. A method of providing an email service, comprising:
providing an email composition interface via a web page browser page;
receiving a destination email address composed by a user, wherein the email address includes a destination domain;
while the user is composing an email message to send to the destination address, determining whether the destination domain composed by the user will receive email by checking the destination domain against a list of destination domains not accepting email, the list of destination domains not accepting email stored in computer storage media; and
providing at least one alternate destination domain to the user via a pop-up window in the email composition interface, if the destination domain is on the list of destination domains not accepting email.

14. The method of claim 13 wherein the step of determining comprising the steps of:
maintaining a list of destination domains previously composed by the user that have been determined to not accept email; and
checking the destination domain against the list destination domains previously composed by the user that have been determined to not accept email.

15. The method of claim 13 wherein the step of providing at least one alternate destination domain to the user comprises the steps of:
accessing the user's address book;
identifying destination domains contained in the user's address book; and
providing at least one of the destination domains identified in the user's address book to the user via the email composition interface as alternate destination domains.

16. A method for sending email, comprising the steps of:
(a) maintaining a list of destination domains previously composed by the user that have been validated as receiving email, the list of destination domains receiving email being maintained on computer storage media;
(b) maintaining a list of destination domains previously composed by the user that have been validated as not able to receive email, the list of destination domains not able to receive email being maintained on the computer storage media;
(c) receiving an email address composed by a user, wherein the email address includes a destination domain;
(d) while the user is composing an email message, determining whether the destination domain contained in the email address received in step (c) is on the list maintained in step (a) and the list maintained in step (b), step (d) performed by a domain check engine by querying the list maintained in step (a) and the list maintained in step (b); and
(e) if the destination domain is on the list maintained in step (b), providing alternate domains to the user.

17. The method as recited in claim 16, wherein step (e) of providing alternate domains to the user comprises the steps of:
(i) accessing the user's address book;
(ii) identifying destination domains contained in the user's address book; and
(iii) providing at least one of the destination domains identified in the user's address book to the user as alternate destination domains.

18. The method as recited in claim 16, wherein step (e) of providing alternate domains to the user comprises the steps of:
(i) identifying destination domains contained in a sent items folder of the user's email client; and
(ii) providing at least one of the destination domains identified in step (i) to the user as alternate destination domains.

* * * * *

UNITED STATES PATENT AND TRADEMARK OFFICE
CERTIFICATE OF CORRECTION

PATENT NO. : 7,689,654 B2  Page 1 of 1
APPLICATION NO. : 11/085373
DATED : March 30, 2010
INVENTOR(S) : Walter It is certified that error appears in the above-identified patent and that said Letters Patent is hereby corrected as shown below:

On The Title Page, Item [73]:

Assignee: delete "SanDisk Corporation, Milpitas, CA" and replace with --Microsoft Corporation, Redmond, Washington--

Signed and Sealed this

Sixteenth Day of November, 2010

David J. Kappos
*Director of the United States Patent and Trademark Office*